(12) United States Patent  
Turner

(10) Patent No.: US 7,111,721 B1
(45) Date of Patent: Sep. 26, 2006

(54) STOP APPARATUS FOR CONVEYOR SYSTEMS

(76) Inventor: Michael L. Turner, 1911 Cornwell Rd., Tompkinsville, KY (US) 42167

( * ) Notice: Subject to any disclaimer, the term of this patent is extended or adjusted under 35 U.S.C. 154(b) by 100 days.

(21) Appl. No.: 11/007,088

(22) Filed: Dec. 8, 2004

(51) Int. Cl.
B65G 11/12 (2006.01)

(52) U.S. Cl. ............... 198/345.3; 198/463.4; 193/35 A

(58) Field of Classification Search ......... 193/35 A; 198/345.3, 463.4, 530; 414/222.04, 222.05, 414/222.06
See application file for complete search history.

(56) References Cited

U.S. PATENT DOCUMENTS

| 3,527,087 A | 9/1970 | Converse, III et al. |
| 4,184,579 A | 1/1980 | Kantarian et al. |
| 4,256,221 A | 3/1981 | Lain |
| 5,211,276 A | 5/1993 | Clopton |
| 5,676,235 A * | 10/1997 | Sam et al. ............... 198/345.3 |
| 5,860,505 A | 1/1999 | Metzger |
| 6,119,843 A | 9/2000 | Robinson |
| 6,213,285 B1 | 4/2001 | Smith |
| 6,220,418 B1 * | 4/2001 | Moradians ............... 193/35 A |
| 6,290,051 B1 | 9/2001 | Herrick, IV |
| 6,676,356 B1 | 1/2004 | Saeki et al. |
| 6,763,930 B1 * | 7/2004 | Johnson et al. .......... 198/459.6 |

FOREIGN PATENT DOCUMENTS

GB 2039236 A 8/1980

* cited by examiner

Primary Examiner—Eileen D. Lillis
Assistant Examiner—Mark A. Deuble
(74) Attorney, Agent, or Firm—Alexander P. Brackett; Middleton & Reutlinger

(57) ABSTRACT

A pallet stop apparatus for interrupting the motion of a pallet or other item along a conveyor system includes a stop head having both an open arm depending and a stop arm depending therefrom and a front surface for engaging a pallet. The apparatus also includes a slide latch having a first end and a second end connected to a means for imparting generally linear motion to said slide latch to engage the open and stop arms of the stop head as said slide latch moves.

15 Claims, 4 Drawing Sheets

STOP APPARATUS FOR CONVEYOR SYSTEMS

BACKGROUND OF THE INVENTION

1. Field of the Invention

The present invention relates generally to conveyor systems and particularly to an improved stop mechanism interposed at a plurality of points in the conveyor path to prevent motion of a pallet being transported by the conveyor.

2. Description of the Related Art

Many automated assembly plants and service facilities utilize a wide variety of conveyor systems to transport articles to a plurality of locations in sequence in order to efficiently produce a finished product or route a package or other item in a commercial system. Oftentimes items are placed or secured on pallets that are conveyed from one station to the next. At some stations the pallets are required to stop so that some action may be accomplished to the articles being conveyed. Accordingly, there is a need for a mechanism to stop the pallets at various points along a conveyor path, and then release the pallets to be conveyed to a subsequent point. This apparatus must be capable of acting against the driving force of the conveyor system to stop the pallets' motion.

SUMMARY OF THE INVENTION

The present invention provides an apparatus for stopping a pallet or other item traveling on a conveyor system having a stop head that is easily positioned into the path of a pallet to stop the motion thereof, and which requires very little energy to hold the pallet in a stopped position. The stop head is rotatable between a stop position for impeding the travel of a pallet, and an open position wherein pallets can travel unimpeded over the top of the stop head.

The stop head is actuated by a slide latch capable of generally linear motion that engages the stop head at a plurality of points to rotate the stop head into the stop or open positions. Furthermore, in one embodiment of the present invention, the stop head may be displaced downwardly by a pallet or object traveling in the opposite direction to the normal direction of travel of the conveyor system. This feature of the invention permits a pallet to be "backed-up" without requiring any special tooling or control system to operate the stop apparatus by simply moving the pallet back over the protruding stop head, which is thereby moved downwardly out of the pallet path.

BRIEF DESCRIPTION OF THE DRAWING FIGURES

DETAILED DESCRIPTION OF THE PREFERRED EMBODIMENT(S)

Figure 1:
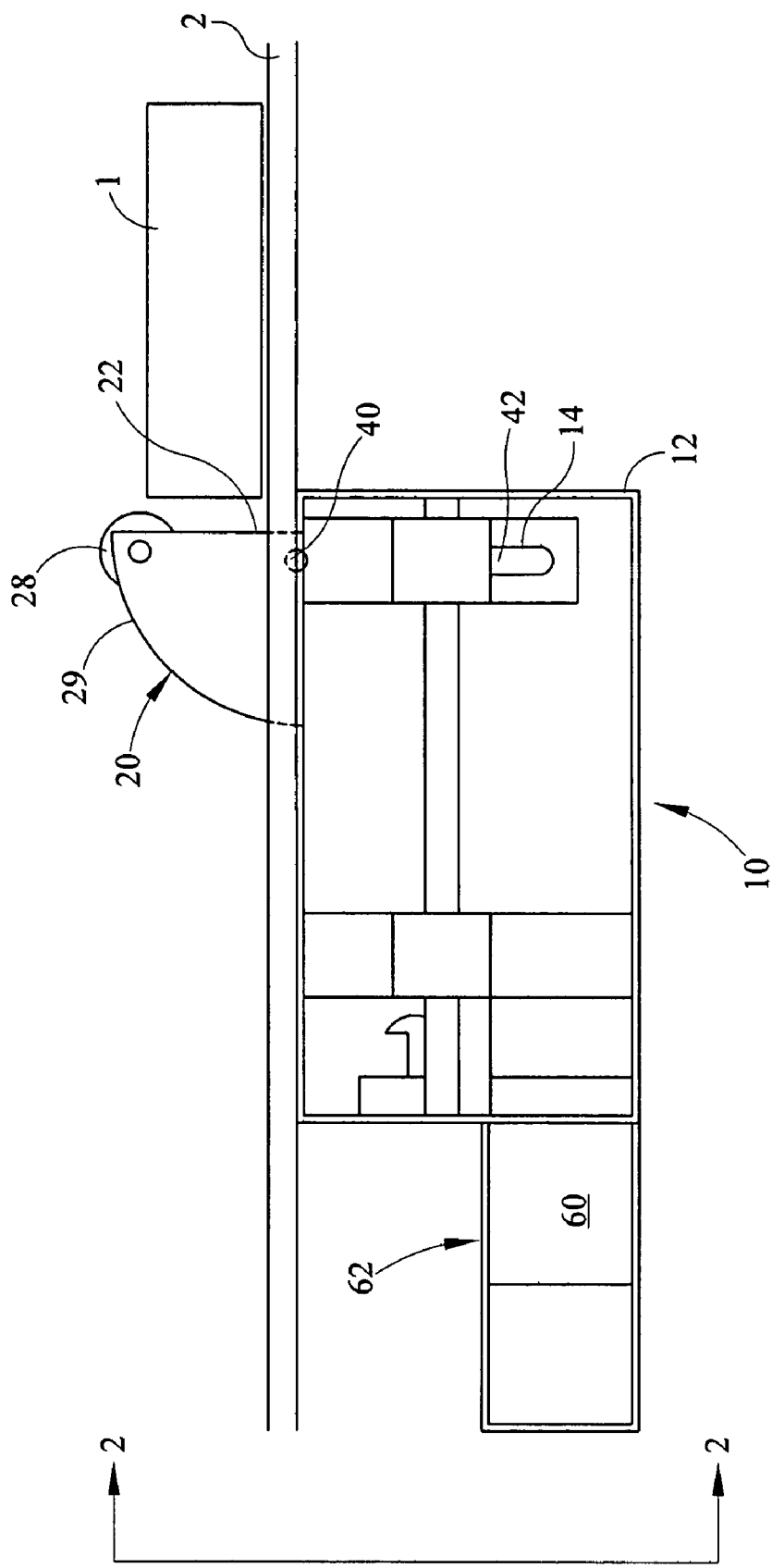
FIG. 1 is an elevation view of a stop head assembly in accordance with one embodiment of the present invention.
Figure 2A:
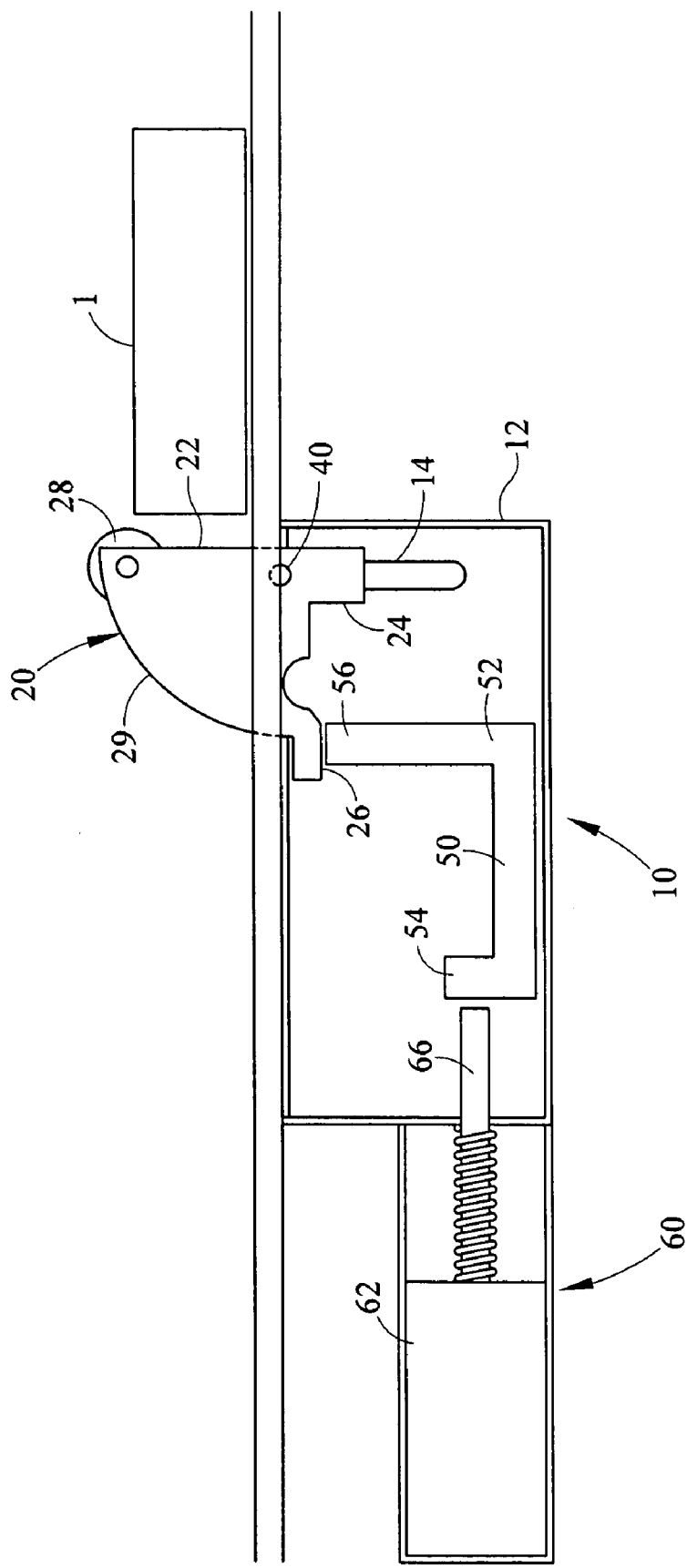
FIG. 2a is a view of a stop head assembly shown in the stop position taken in section along the line 2—2 of FIG. 1 in accordance with one embodiment of the present invention.
Figure 2B:
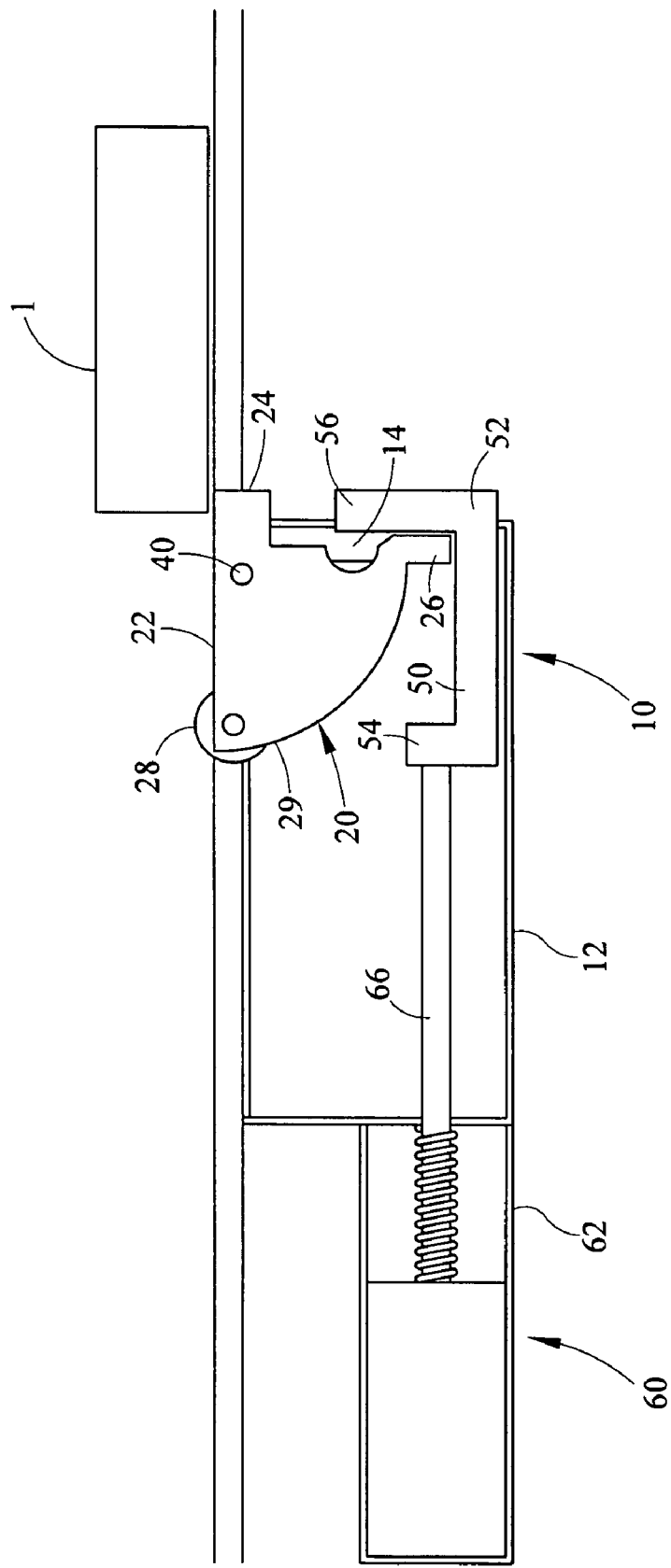
FIG. 2b is a view of a stop head assembly shown in the open position taken in section along the line 2—2 of FIG. 1 in accordance with one embodiment of the present invention.
Figure 3:
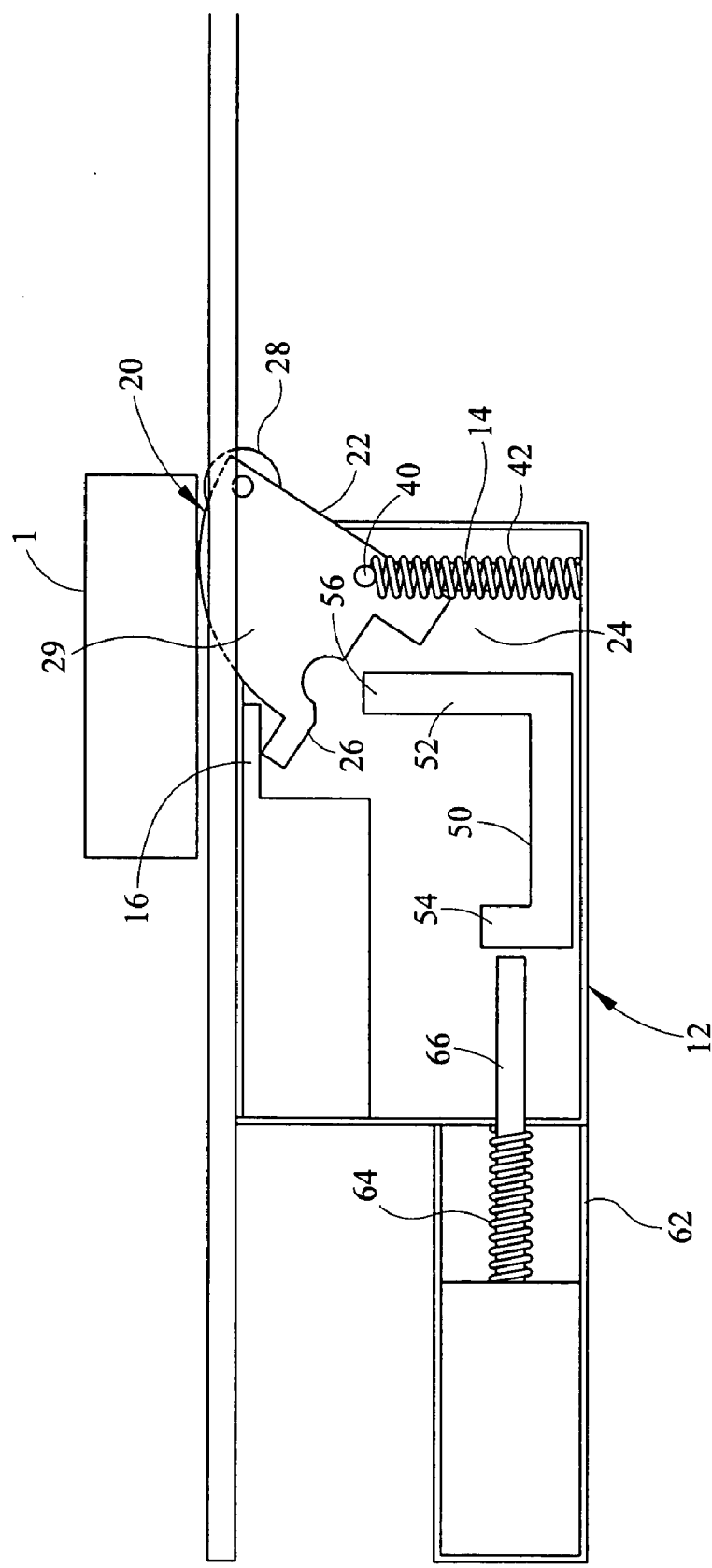
FIG. 3 is a view similar to FIGS. 2a and 2b wherein the stop head assembly is shown in a retracted position in accordance with one embodiment of the present invention.

Referring now to drawing FIGS. 1–3, and in accordance with a preferred constructed embodiment of the present invention, an apparatus 10 for stopping the progress of a pallet 1 or other item being transported by a conveyor 2 may include a housing 12 enclosing a stop head 20 having a front surface 22 for engaging the pallet 1 being conveyed, thereby preventing further forward motion thereof along the conveyor 2 path.

The stop head 20 includes an open arm 24 and a stop arm 26 depending therefrom wherein the respective arms are acted upon to rotate or pivot the stop head 20 into either an open or pallet stop position, as will be described in detail herein below. The stop head 20 pivots or rotates about an axis of rotation, defined by a wrist pin 40 in one embodiment of the invention. Alternatively, the stop head 20 may rotate about a plurality of ball bearings, ball joints, or universal joints.

The present invention further comprises a slide latch 50 having a first end 52 for engaging the open arm 24 and stop arm 26 of the stop head 20, and a second end 54 that is connected to a means 60 for imparting generally linear motion to the slide latch 50. The means 60 for imparting generally linear motion may be a cylinder/piston assembly 62 that engages the second end 54 of the slide latch 50, or alternatively a cam follower secured thereto, or a solenoid actuator energized to drive a shaft, or any equivalent mechanism capable of moving the slide latch 50 forward and then permitting the slide latch to move, or alternatively, positively moving it backwards.

As best seen in FIGS. 2a and 2b, in one embodiment of the present invention the means 60 for imparting generally linear motion to the slide latch 50 comprises a one-way cylinder/piston assembly 62 that is biased by a spring 64, whereby the piston 66 is driven outwardly from the cylinder to force the slide latch 50 forward, thereby causing the first end 52 of the slide latch 50 to engage the open arm 24 of the stop head 20 and rotate the stop head 20 into the open position (FIG. 2b). Note that any of a wide variety of systems may be employed to drive the piston including, but not limited to air, hydraulics, and internal combustion.

Once the stop head 20 is in the open position, a pallet may pass freely over the stop head 20. The spring 64 then biases the piston 66 back into the cylinder 62, thereby moving the slide latch 50 backwardly such that the first end 52 engages the stop arm 26 of the stop head 20, causing rotation thereof back to the stop position (clockwise rotation as viewed from the perspective of the drawing Figures). In the stop position, the first end 52 of the slide latch 50 supports the stop arm 26 in such a fashion that the stop head 20 can not rotate until the slide latch 50 is first moved forward since the stop arm 26 must initially move downwardly to begin the rotation of the stop head 20. Furthermore, as best seen in FIG. 2a, no energy is required to hold the stop head 20 in the closed position since the stop head 20 is prevented from rotation by the slide latch 50 supporting the stop arm 26. Since the slide latch 50 is capable of only generally linear motion, the stop arm 26 can not rotate downwardly against the slide latch first end 52.

In one embodiment of the present invention, the stop head 20 includes a bearing or radial track roller 28 disposed in the front surface 22 to enable smooth motion of a pallet over the stop head 20 when in the open position. This feature of the present invention is particularly advantageous where a pallet employs grooves or tracks on its bottom surface for guidance or indexing purposes since the roller 28 can "follow" the groove as the pallet passes over the open stop head 20.

In another embodiment of the present invention, the slide latch 50 first end 52 includes an engagement portion 56 that depends from the slide latch 50 at a right angle. The engagement portion 56 then contacts the open arm 24 and stop arm 26 as the slide latch 50 moves.

In a further embodiment of the invention the wrist pin 40 around which the stop head 20 rotates may be inserted through and travel in a pair of opposed slots 14 in the housing 12. As best seen in FIGS. 1 and 3, the wrist pin 40 may be biased upwardly by at least one spring element 42 such that, in its normal operating position, the wrist pin 40 is forced upwardly proximate the top of the slots 14. In this position, the stop head 20 rotates open and closed (stop position) as discussed herein above. However, if it is necessary to move a pallet backwardly along a conveyor line, this feature of the present invention permits a pallet to being moved backwardly to force the stop head 20 to rotate clockwise (as seen from the perspective of the drawing Figures) and simultaneously forces the stop head 20 down, since the wrist pin 40 is capable of downward movement in the slots 14 against the biasing force provided by the spring element 42. A wide variety of spring elements 42 may be employed in this embodiment of the present invention, including, but not limited to leaf springs, coil springs, elastomer bricks and elastic bands.

Note that in this embodiment of the invention, the clockwise rotation of the stop head 20 is stopped by the first end 52 of the slide latch 50 so that the stop head 20 can not over-rotate. Furthermore, the housing 12 may include a retaining block 16 that contacts the stop arm 26 as the stop head 20 is forced upwardly by the springs 42. This feature of the invention forces the stop head 20 to positively return to its proper stop position once a reversed pallet clears the stop head's position.

In a yet further embodiment of the present invention, the stop head 20 includes a rounded rear portion 29 for contacting a reverse-traveling pallet that facilitates the clockwise rotation and downward motion of the stop head 20 as a pallet passes over in the reverse direction.

The foregoing detailed description is presented primarily for clearness of understanding and no unnecessary limitations are to be understood therefrom. Modifications to the present invention will become obvious to those skilled in the art upon reading this disclosure and may be made without departing from scope of the invention and the claims included herein below.

I claim:

1. A pallet stop apparatus comprising:
a stop head having both an open arm and a stop arm depending therefrom and a front surface for engaging a pallet, said stop head rotatable about an axis of rotation;
a slide latch having a first end and a second end connected to a means for imparting generally linear motion to said slide latch wherein the first end engages the open arm of said stop head as said slide latch moves forward and engages the stop arm of said stop head as said slide latch moves backward.

2. A pallet stop apparatus as claimed in claim 1 further comprising a housing enclosing said stop head and said slide latch.

3. A pallet stop apparatus as claimed in claim 2 wherein said housing has a pair of opposed slots therein.

4. A pallet stop apparatus as claimed in claim 3 further comprising a wrist pin around which said stop head is rotatable and wherein said wrist pin is inserted through and travels in the pair of opposed slots.

5. A pallet stop apparatus as claimed in claim 4 wherein said wrist pin is biased upwardly by at least one spring means.

6. A pallet stop apparatus as claimed in claim 5 further comprising a retaining block that contacts the stop arm of said stop head as it is forced upwardly by the at least one spring means.

7. A pallet stop apparatus as claimed in claim 1 further comprising a wrist pin around which said stop head is rotatable.

8. A pallet stop apparatus as claimed in claim 7 wherein said wrist pin is biased upwardly by at least one spring means.

9. A pallet stop apparatus as claimed in claim 8 wherein said at least one spring means comprises a coil spring.

10. A pallet stop apparatus as claimed in claim 8 wherein said at least one spring means comprises an elastomer brick.

11. A pallet stop apparatus as claimed in claim 8 wherein said at least one spring means comprises an elastic band.

12. A pallet stop apparatus as claimed in claim 8 wherein said at least one spring means comprises a leaf spring.

13. A pallet stop apparatus as claimed in claim 1 wherein said means for imparting generally linear motion is a cylinder and piston assembly and wherein said piston engages the second end of said slide latch.

14. A pallet stop apparatus as claimed in claim 13 further comprising a spring for biasing said piston into said cylinder.

15. A pallet stop apparatus as claimed in claim 1 wherein said means for imparting generally linear motion is a cam follower that engages the second end of said slide latch.

* * * * *